United States Patent
Blinn et al.

(10) Patent No.: US 7,173,967 B2
(45) Date of Patent: Feb. 6, 2007

(54) METHOD FOR DETERMINING THE FILTER COEFFICIENTS OF A DIGITAL TIME DOMAIN EQUALIZER FOR A MULTICARRIER FREQUENCY SIGNAL

(75) Inventors: Thomas Blinn, Käshofen (DE); Werner Kozek, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 451 days.

(21) Appl. No.: 10/257,675

(22) PCT Filed: Apr. 12, 2001

(86) PCT No.: PCT/DE01/01441

§ 371 (c)(1), (2), (4) Date: Apr. 3, 2003

(87) PCT Pub. No.: WO01/78340

PCT Pub. Date: Oct. 18, 2001

(65) Prior Publication Data

US 2003/0151469 A1      Aug. 14, 2003

(30) Foreign Application Priority Data

Apr. 12, 2000   (DE) ................. 100 18 133

(51) Int. Cl.
  *H03H 7/30* (2006.01)
  *H03H 7/40* (2006.01)
  *H03K 5/159* (2006.01)
(52) U.S. Cl. .............. 375/232; 375/229; 375/260; 708/322; 708/323
(58) Field of Classification Search ............... 375/229, 375/230, 231, 232, 233, 350; 708/322, 323
See application file for complete search history.

(56) References Cited

U.S. PATENT DOCUMENTS

| 5,461,640 | A | 10/1995 | Gatherer | |
|---|---|---|---|---|
| 5,870,432 | A * | 2/1999 | Kerckhove | 375/232 |
| 6,151,358 | A * | 11/2000 | Lee et al. | 375/232 |
| 6,396,886 | B1 * | 5/2002 | Kapoor | 375/350 |
| 6,408,022 | B1 * | 6/2002 | Fertner | 375/230 |

FOREIGN PATENT DOCUMENTS

| DE | 197 35 216 C2 | 2/1999 |
|---|---|---|
| EP | 0 946 025 A2 | 9/1999 |

OTHER PUBLICATIONS

"Matrix Computations" by Gene Golub et al., c. 1983.
XP-000773405: "Time-Domain Equalization for Multicarrier Communication" by Mark van Bladel et al., c. 1995.
XP-000549644: "Optimum Finite-Length Equalization for Multicarrier Transceivers" by Naofal Al-Dhahir et al., c. 1996.
"Maximizing the Channel Capacity of a Multicarrier Transmission by a Suitable Adaptation Procedure for the Time-Domain Equalizer" by Werner Henkel et al.

* cited by examiner

*Primary Examiner*—Phuong Phu
(74) *Attorney, Agent, or Firm*—Morrison & Foerster LLP

(57) ABSTRACT

A vector space comprising all of the filter coefficients for different interfering signals is provided, based on an acquired impulse response. A linear vector sub-space comprising all of the optimal filter coefficients for different interfering signals is established from said vector space using a vector space optimization method. The filter coefficients are established from the vector sub-space according to the current interfering signal being detected, during ongoing data transmission and at the maximum transmission speed.

8 Claims, 2 Drawing Sheets

METHOD FOR DETERMINING THE FILTER COEFFICIENTS OF A DIGITAL TIME DOMAIN EQUALIZER FOR A MULTICARRIER FREQUENCY SIGNAL

CLAIM FOR PRIORITY

This application claims priority to International Application No. PCT/DE01/01441 which was published in the German language on Oct. 18, 2001.

TECHNICAL FIELD OF THE INVENTION

The invention relates to a method for determining the filter coefficients of a digital time domain equalizer for a multicarrier frequency signal.

BACKGROUND OF THE INVENTION

Multicarrier transmission methods are being used increasingly for transmitting information at high transmission rates. Known methods include, for example, the OFDM (orthogonal frequency division multiplexing) transmission method and the DMT (discrete multitone) transmission method. Both methods are based on the implicit synthesis of the multicarrier signal by fast Fourier transformation, and on the use of a cyclic guard interval. This cyclic time interval, which is referred to as a prefix in the specialist world, is inserted between adjacent transmission signal blocks and includes a predetermined number of sample values of a preceding transmission signal block. The use of a prefix allows efficient frequency domain equalization, provided that the impulse response of the equivalent, time-discrete transmission signal is shorter than the length of the prefix. Longer impulse responses require the additional use of a time domain equalizer. A time domain equalizer is applied directly to the sample values of a transmission signal arriving in a receiver. A conventional structure of a receiver and of a transmitter is described, by way of example, in IEEE 1996, pages 56–64, "Optimum Finite-Length Equalization for Multicarrier Transceiver", Aldhahir. For certain applications—for example for the xDSL transmission technique (x Digital Subscriber Line) or from a technique of transmitting via power supply lines (Power Line Communication),—a bi-directional coordinated setting-up phase is possible, in which an estimated value can be determined for the channel impulse response. This estimated value allows adaptation of the time domain equalizer.

A time domain equalizer in which the coefficients for the time domain equalizer are determined from a channel impulse response with the aid of a substitution system—that is a discrete equalizer model—is already known from the documents IEEE 1995, Van Bladel and Moeneclay; pages 167 to 171, "Time-Domain Equalizer for Multicarrier Communication". The calculation is carried out as an eigen value problem, which is related to a suitably defined correlation matrix. One disadvantage of this method is that an abstract, mean signal-to-noise ratio is optimized, which does not lead to an optimum rate or to a minimum bit error probability. Such optimization or determination of the filter coefficients is proposed in Henkel and Kessler, "Maximizing the Channel Capacity of Multicarrier Transmission by a Suitable Adaptation Procedure for Time Domain Equalizer", Deutsche Telekom. This is based on global optimization in a vector space whose dimension is equal to the length of the transversal filter to be adapted, and is typically k=32–64. The unavoidable size of the vector space leads firstly to considerable numerical complexity, that is to say to high computer power, and secondly to instabilities in the optimization procedure, which can lead to a reduction in the achievable data transmission rate.

SUMMARY OF THE INVENTION

The invention seeks to improve the determination of the coefficients for time domain equalizers.

In one embodiment according to the invention, a vector subspace, which comprises the filter coefficients for different disturbance signals, is represented by an orthogonal base(e), based on a determined impulse response and with the aid of a vector space optimization method, and the coefficients which define the optimum filter coefficients as an element of the vector subspace are determined as a function of the currently estimated disturbance signal. One advantage of the invention is that it is possible to considerably reduce the numerical complexity, that is the computer complexity, for determining the filter coefficients during data transmission when subdivision into vector subspaces is carried out at the start of a data transmission. This is possible since the dimension of a suitable vector subspace—for example d=2–4—is considerably less than the dimension of the complete vector space—for example d=32–64. Furthermore, splitting the vector space into vector subspaces results in a behavior which is more robust with respect to disturbance influences.

In one aspect of the invention, the vector subspace is advantageously determined at the start of a data transmission in the course of an initialization procedure, and the filter coefficients are readjusted, as an element of the vector subspace, during data transmission. This focuses the computation effort at the start of data transmission for the process of determining the vector subspace, and considerably reduces the computation effort during data transmission, so that is possible to calculate the filter coefficients during data transmission, even for high transmission rates.

According to another aspect of the invention, the filter coefficients are determined from the vector subspace by a non-linear optimization method, with the signal-to-noise ratio being determined for each carrier frequency for the non-linear optimization. In this case, the non-linear optimization method is tuned to maximize the transmission rate during the initialization procedure, and to maximize the signal-to-noise ratio after the initialization procedure. This means that the signal-to-noise power ratio is included in the non-linear optimization process after determining the vector subspace, taking account of the maximum transmission rate as an essential boundary condition.

The linear vector subspace is preferably defined as a solution of a partial eigen problem of the vector space, the eigen vector subspace which represents one solution of the partial eigen problem being calculated by means of an orthogonal iteration method. Various methods are known and may be used as the iteration method for non-linear optimization processes.

BRIEF DESCRIPTION OF THE DRAWINGS

The method according to the invention will be explained in more detail in the following text with reference to the drawings, in which.

DETAILED DESCRIPTION OF THE PREFERRED EMBODIMENTS

Figure 1:
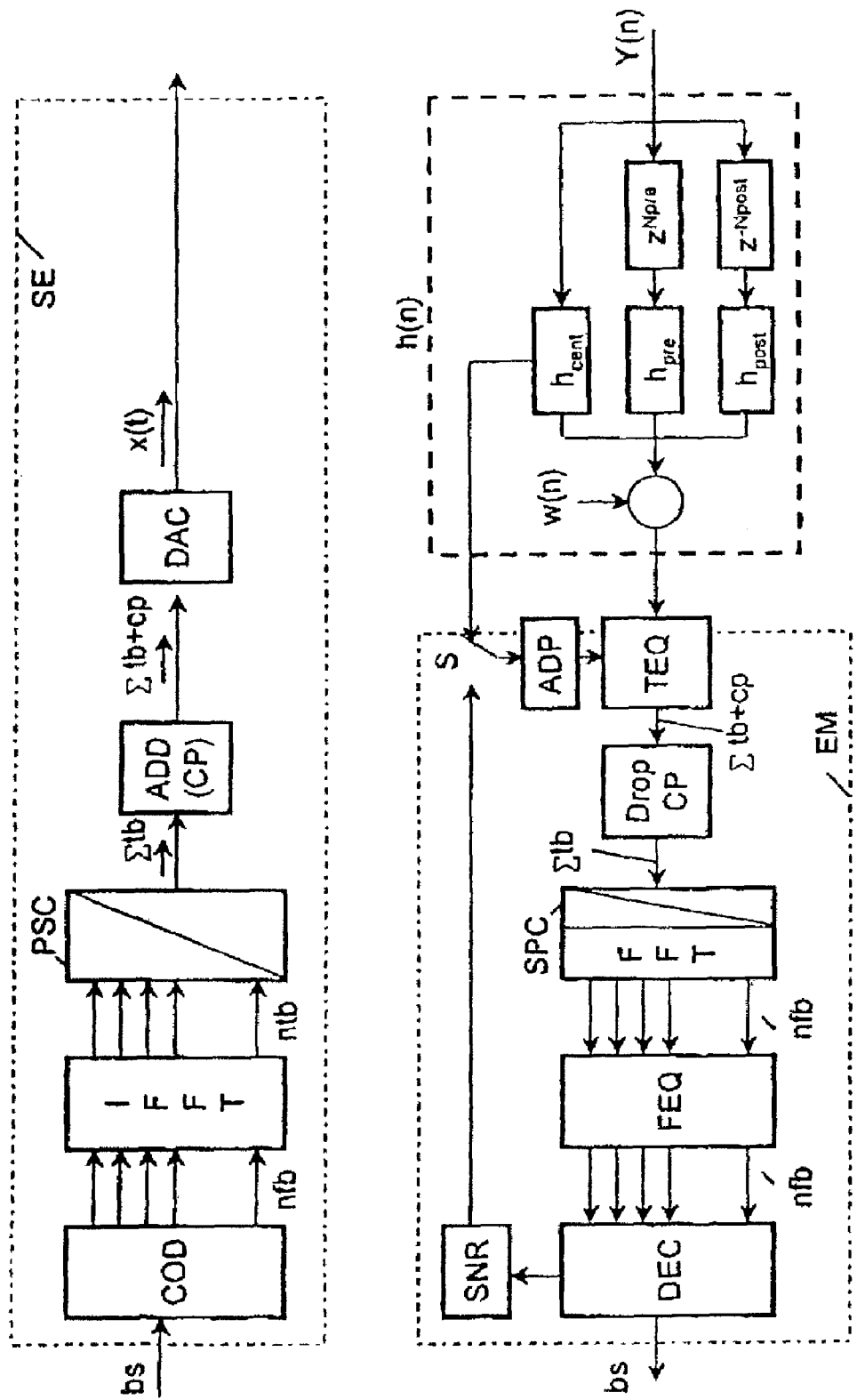
FIG. 1 shows an exemplary block diagram of the structure of a transceiver which operates on the basis of the OFDM method.

FIG. 1 shows the structure of a transceiver, which is formed by a transmission path SE and a reception path EM—each indicated by a dashed-dotted rectangle—for a multicarrier frequency signal. A multicarrier signal such as this is used for the OFDM (orthogonal frequency division multiplex) transmission method. In this case, a bit stream bs to be transmitted is stored in blocks in a coder COD, and the individual bits in a block are distributed optimally between the n carrier frequencies or n sub-channels. The distributed bits in the n sub-channels are mapped by means of the coder COD onto n complex sub-symbols nfb—frequency domain. The n complex sub-symbols are then transformed by means of inverse Fourier transformation (inverse fast Fourier transform)—generally in the form of an integrated circuit IFFT—to n reel sample values ntb—discrete time domain, and are converted by means of a parallel/serial converter PSC to a serial format, forming a transmission block Σtb. A time interval or a prefix cp is placed in front of the serial digital transmission block Stb in a unit ADD and, after digital/analog conversion by means of a digital/analog converter DAC, is sent as an analog transmission signal x(t) to a transmission channel or to the transmission medium—not shown. The prefix cp represents a guard interval between successive transmission blocks tb, and contains a predetermined number of sample values of the preceding transmission block tb.

Figure 3:
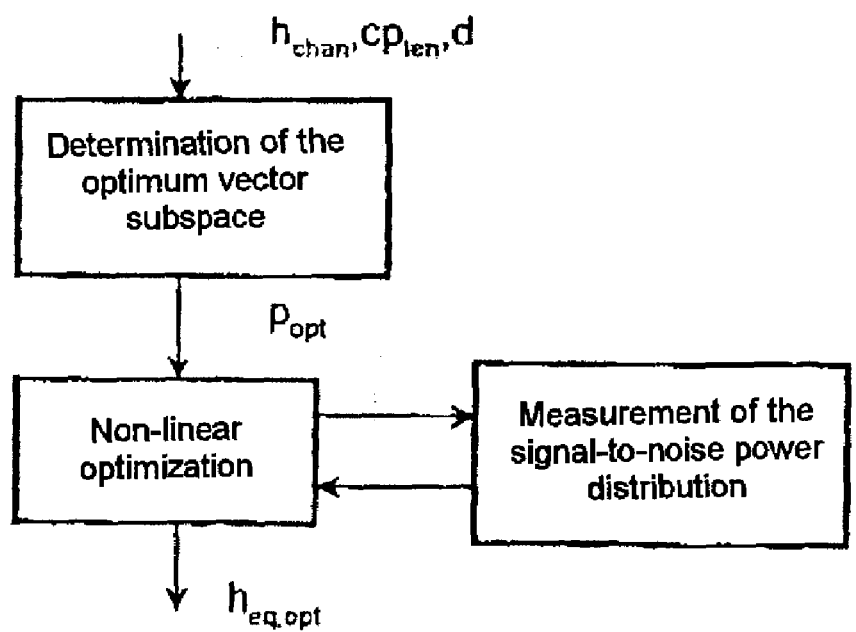
FIG. 3 shows the functional structure for coefficient adaptation.

FIG. 3 shows a method of operation of the adaptation of a time domain equalizer TEQ, which operates in accordance with the method according to the invention, in the receiver path. The adaptation is carried out in an adaptation unit ADP—see FIG. 1—with signal processors preferably being used for the determination process. In the method according to the invention, estimated channel impulse responses $h_{chan}$ are in principle used for the adaptation process, with these being determined by means of a suitable estimation method—for example the least square error method as described in Golub, van Loan: Matrix Computations, John Hopkins University Press, 1996, page 236.

Figure 2:
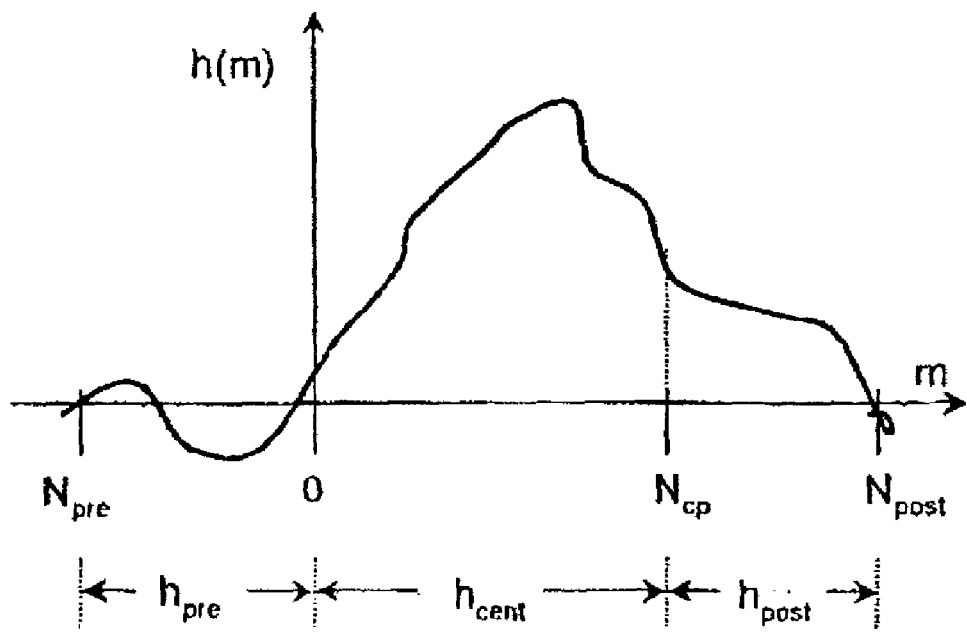
FIG. 2 shows the impulse response of the transmission channel.

An impulse response $h_{chan}$ for a transmission block tb may, as illustrated in FIG. 2, in principle be broken down to three impulse response elements:
- a central impulse response element $h_{cent}$, whose length is equal to the length of the prefix cp plus one sample value,
- a precursor impulse response element $h_{pre}$ and
- a postcursor impulse response element $h_{post}$.

A delay module $z^{NPre}$, $z^{-Npost}$ is in each case provided for modeling precursor impulse response element $h_{pre}$ and the postcursor impulse response element $h_{post}$—see FIG. 1. The central impulse response element $h_{cent}$ makes a positive contribution to the signal-to-noise ratio, that is it increases the signal-to-noise ratio, while the precursor impulse response element $h_{pre}$ and the postcursor impulse response element $h_{post}$ reduce the signal-to-noise ratio.

During the initialization phase, the estimated channel impulse response $h_{chan}$, that is three impulse response elements $h_{cent}$, $h_{pre}$, $h_{post}$, are used as the basis for the adaptation process, that is for determining the coefficients of the transversal filter in the time domain equalizer TEQ—see also FIG. 3. From these three estimated impulse response elements $h_{cent}$, $h_{pre}$, $h_{post}$, it is possible to derive those matrices whose eigen vectors define a relatively small-dimensional (d=2 to 4) optimum vector subspace $p_{opt}$ for determining the coefficients $h_{eq,opt}$ of the transversal filter (k=32–64) to be adapted. This optimum vector subspace $p_{opt}$ is determined once on activation of a given physical transmission channel or of a transmission medium and/or at the start of data transmission, and remains unchanged during the data transmission. Orthogonal vector iteration, as described by way of example in Golub, van Loan: Matrix Computations, John Hopkins University Press, 1996, page 332, can advantageously be used for determining the vector subspace $p_{opt}$. The input parameters for the adaptation are in this case the length of the cyclic prefix $cp_{len}$, the estimated channel impulse response $h_{chan}$, and the dimension d of the vector subspace $p_{opt}$ to be determined. The optimum vector subspace $p_{opt}$ is represented for a subsequent non-linear optimization process by basic vectors $e_k$—whose length corresponds to the number of transversal filter coefficients—that is to say the coefficients considered for the non-linear optimization process can be described mathematically as follows:

$$h_{eq}(n) = \sum_{k=1}^{d} a_k e_k(n)$$

In this case, d corresponds to the dimension of the vector subspace and $a_k$ represents the coefficients that are still to be optimized.

The non-linear optimization process in the vector subspace $p_{opt}$ is carried out continuously during data transmission, that is to say the adaptation relates only to those n coefficients $a_{k,opt}$ which are required for identification of one element in the vector subspace $p_{opt}$. The optimum coefficients of the transversal filter TEQ are thus given by:

$$h_{eq,opt}(n) = \sum_{k=1}^{d} a_{k,opt} e_k(n)$$

The influences of additive disturbances w(n) are taken into account in the non-linear optimization of the vector subspaces $p_{opt}$. Furthermore, the adaptation of the time domain equalizer TEQ also influences the signal-to-noise power ratio. In order to avoid instabilities as a result of the disturbances w(n) and the influence during the adaptation of the time domain equalizer TEQ, it is thus sensible to use small step widths in conventional non-linear optimization methods.

After time-domain equalization of the channel impulse response $h_{chan}$ and/of the transmission block Σtb+cp in the time domain equalizer TEQ, the prefix cp is removed once again in a device DROP. The transmission blocks Stb are broken down once again into n time-discrete sample values by means of a serial/parallel converter SPC, and are then transformed by means of a Fourier analysis FFT (fast Fourier transformation) to the n frequency-discrete sub-symbols nfb. The sub-symbols which represent the n carrier frequencies can be broken down in the frequency domain by means of a frequency domain equalizer FEQ. The information contained in the n carrier frequencies is decoded by means of a downstream decoder DEC, and is combined to form a bit stream bs.

In the course of decoding the sub-symbols, the signal-to-noise power ratio SNR is measured in a signal unit SNR which is connected to the decoder. The signal-to-noise power ratio SNR is supplied via a switch S to the adaptation unit ADP, in which the filter coefficients $h_{eq,opt}$ are determined for the time domain equalizer TEQ. The signal-to-noise power ratio SNR is included in the optimization method for determining the filter coefficients $h_{eq,opt}$ during data transmission, that is after the initialization phase. During the initialization phase, that is at the start of data transmission, the central impulse response element $h_{cent}$ is included in the optimization method, by which means the filter coefficients $h_{eq,opt}$ are determined for a maximum transmission rate. Either the signal-to-noise power ratio SNR or the central impulse response element $h_{cent}$ is applied to the adaptation unit ADP by means of the switch S, depending on the current transmission phase—start or during data transmission.

The use of the method according to the invention is not restricted to the exemplary embodiment described above, but may also be used for all transmission methods in which an extensive, multidimensional vector space is determined from a channel impulse response $h_{chan}$, and the aim is to determine as small a number of filter coefficients as possible for optimization of a time domain equalizer. In this case, different optimization methods may be used for determining the vector subspace and/or the eigen value problem, and also for the non-linear optimization of the vector subspace.

The invention claimed is:

1. A method for determining filter coefficients of a digital transversal filter for equalization of a multi-carrier frequency signal which is transmitted via a dispersive transmission medium, comprising:

representing a vector subspace, which comprises the filter coefficients for different disturbance signals, by an orthogonal base, based on a determined impulse response and with a vector space optimization method;

defining the linear vector subspace as a solution of a partial eigen problem relating to the vector space; and determining the coefficients which define the optimum filter coefficients as an element of the vector subspace as a function of a currently estimated disturbance signal.

2. The method as claimed in claim 1, wherein the optimum filter coefficients are defined as an element of the vector subspace in accordance with:

$$h_{eq,opt}(n) = \sum_{k=1}^{d} a_{k,opt} e_k(n)$$

where n corresponds to the number of coefficients and d corresponds to the dimension of the vector subspace.

3. The method as claimed in claim 1, wherein the determination of the vector subspace is carried out at a start of data transmission during an initialization procedure, and the filer coefficients are readjusted, as an element of the vector subspace, during data transmission.

4. The method as claimed in claim 1, wherein the filter coefficients are determined from the vector subspace by a non-linear optimization method, with a signal-to-noise ratio being determined for each carrier frequency for a non-linear optimization.

5. The method as claimed in claim 4, wherein the non-linear optimization method is tuned to maximize a transmission rate during an initialization procedure, and to maximize the signal-to-noise ratio after the initialization procedure.

6. The method as claimed in claim 1, wherein an eigen vector subspace which represents one solution of the partial eigen problem is calculated by an orthogonal iteration method.

7. A method for determining filter coefficients of a digital transversal filter for equalization of a multi-carrier frequency signal which is transmitted via a dispersive transmission medium, comprising:

representing a vector subspace, which comprises the filter coefficients for different disturbance signals, by an orthogonal base, based on a determined impulse response and with a vector space optimization method; and determining the coefficients which define the optimum filter coefficients as an element of the vector subspace as a function of a currently estimated disturbance signal, wherein the optimum filter coefficients are defined as an element of the vector subspace in accordance with:

$$h_{eq,opt}(n) = \sum_{k=1}^{d} a_{k,opt} e_k(n)$$

where n corresponds to the number of coefficients and d corresponds to the dimension of the vector subspace.

8. A method for determining filter coefficients of a digital transversal filter for equalization of a multi-carrier frequency signal which is transmitted via a dispersive transmission medium, comprising:

representing a vector subspace, which comprises the filter coefficients for different disturbance signals, by an orthogonal base, based on a determined impulse response and with a vector space optimization method; and determining the coefficients which define the optimum filter coefficients as an element of the vector subspace as a function of a currently estimated disturbance signal, wherein the filter coefficients are determined from the vector subspace by a non-linear optimization method, with a signal-to-noise ratio being determined for each carrier frequency for a non-linear optimization.

* * * * *